United States Patent [19]

O'Dell

[11] 4,040,182

[45] Aug. 9, 1977

[54] HOLDER FOR GLASS CUTTER

[76] Inventor: Dennis R. O'Dell, 2924 Downey St., Independence, Mo. 64056

[21] Appl. No.: 693,486

[22] Filed: June 7, 1976

[51] Int. Cl.² .................. B26B 25/00; C03B 33/10
[52] U.S. Cl. .................................................. 30/164.95
[58] Field of Search .......... 30/164.9, 164.95, 232, 30/298, 307, 312, 314; 24/263 SW, 25; 16/114 R

[56] References Cited

U.S. PATENT DOCUMENTS

| 433,537 | 8/1890 | McGar | 30/164.95 |
|---|---|---|---|
| 2,125,864 | 8/1938 | Auckland | 30/164.95 X |
| 2,892,291 | 6/1959 | Coleman | 30/164.95 |
| 3,834,021 | 9/1974 | White | 30/232 |

*Primary Examiner*—Al Lawrence Smith
*Assistant Examiner*—J. C. Peters
*Attorney, Agent, or Firm*—Clarence A. O'Brien; Harvey B. Jacobson

[57] ABSTRACT

A holder for a glass cutter has a bent palm contacting member attachable to the handle of a glass cutter for steadying the cutter during use. Removably connecting the palm contacting member to the cutter handle is a tapered sleeve of rectangular cross section which cooperates with tapered legs provided on the palm contacting member for creating a wedging action securing the contacting member on the cutter handle. By placing the cutter handle between the forefinger and middle finger of a user's hand and fitting the contacting member snugly in the palm of the same hand, the operator is enabled to hold the cutter very steady while pressing on the cutter against glass to be cut.

8 Claims, 6 Drawing Figures

U.S. Patent  Aug. 9, 1977  4,040,182
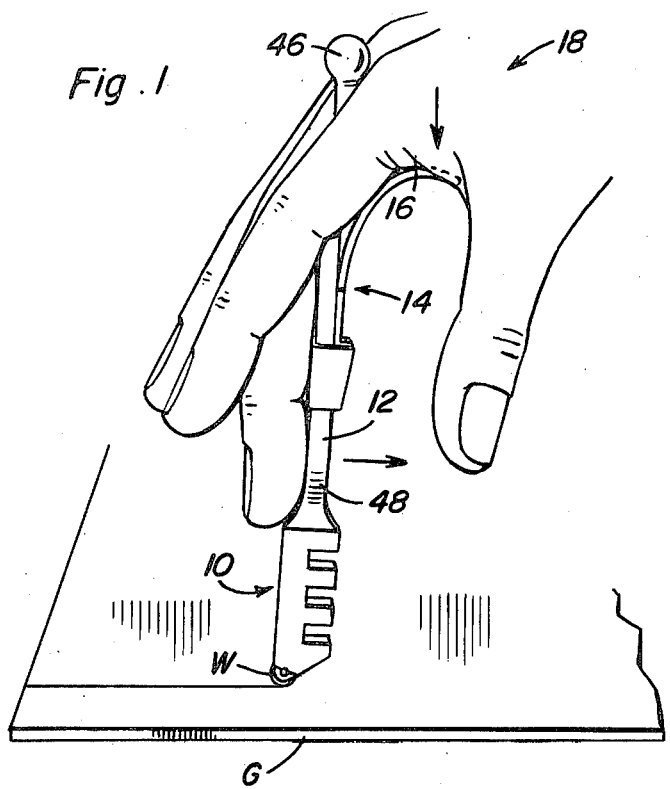
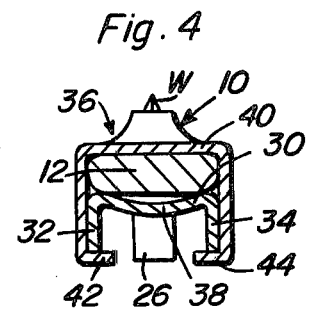
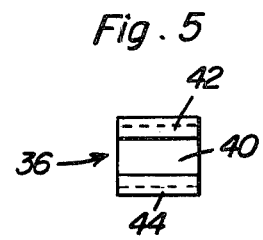
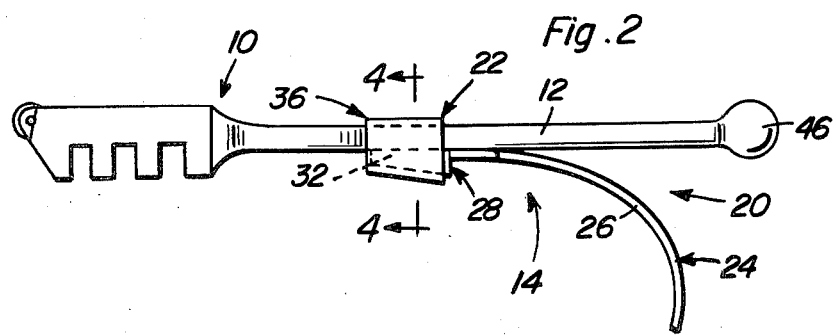
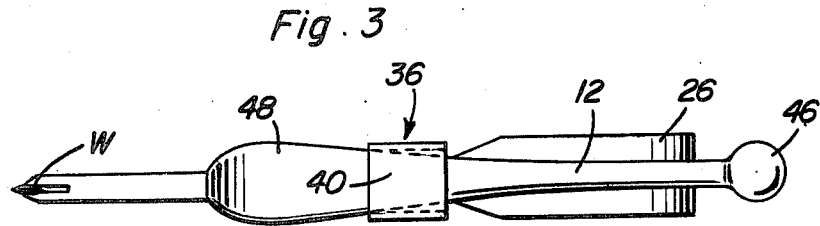
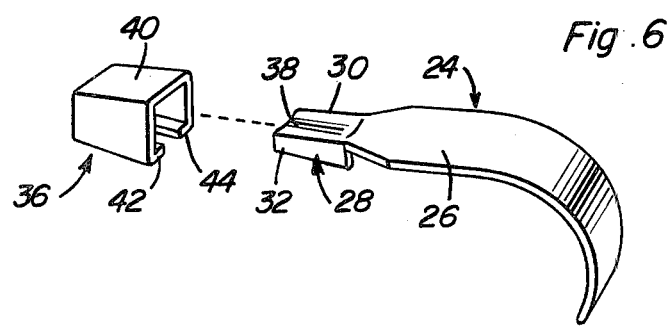

HOLDER FOR GLASS CUTTER

BACKGROUND OF THE INVENTION

1. Field of the Invention

This invention relates generally to glass cutters, and particularly to a holder for a glass cutter which increases the control over the cutter during glass cutting operations.

2. Description of the Prior Art

A conventional and commonly used glass cutter has a small cutting wheel rotatably mounted in a cutting head attached to an elongated, substantially straight handle. Limitation on this cutter construction, however, is encountered die to the inability of an operator to hold the cutter sufficiently steady to permit the operator to exert proper pressure on the cutter while still making a straight or otherwise proper cut on the glass.

I am aware of the following patents which may be pertinent to the invention:

| | |
|---|---|
| 229,228 | June 29, 1880 |
| 483,778 | October 4, 1892 |
| 1,028,870 | June 11, 1912 |
| 1,189,957 | July 4, 1916 |
| 1,237,935 | August 21, 191 |
| 1,547,451 | September 28, 1925 |
| 2,892,291 | July 30, 1959 |

SUMMARY OF THE INVENTION

It is an object of the present invention to provide a holder which permits a glass cutter to be held in a steadier manner than can be achieved by the use of the conventional cuttter handle alone.

It is another object of the present invention to provide a glass cutter holder which allows a greater pressure to be placed evenly upon the cutter end, thus, against the glass by the pressure of the whole hand of an operator rather than merely the pressure of one of the operator's fingers on the cutter.

These and other objects are achieved according to the present invention by providing a holder having: a palm contacting member arranged for steadying a glass cutter; and an attachment member disposable for retaining the palm contacting member on a handle of the glass cutter.

The palm contacting member preferably is a bent member including a curved portion arranged for contacting a palm of an operators's hand, and a connecting portion having a substantially U-shaped including a back section and a pair of spaced, substantially parallel, coextending legs depending from the back section.

According to an advantageous feature of preferred embodiment of the invention, the attachment member includes a sleeve of generally rectangular cross section. This sleeve, which is preferably tapered, engages the legs of the connecting portion of the bent member, which legs are also preferably tapered, for achieving a wedging action which securely connects the bent member on the handle of the glass cutter.

These together with objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a fragmentary, perspective view showing a glass cutter provided with a holder according to the present invention being held in an operator's hand during a glass-cutting operation.

FIG. 2 is a side elevational view showing a glass cutter provided with a holder according to the invention.

FIG. 3 is a top plan view showing the arrangement of FIG. 2.

FIG. 4 is an enlarged, sectional view taken generally along the line 4—4 of FIG. 2.

FIG. 5 is a bottom plan view showing an attachment member for use in connecting a holder according to the invention to the handle of a glass cutter.

FIG. 6 is an exploded, perspective view showing a holder and associated member according to the present invention.

DESCRIPTION OF THE PREFERRED EMBODIMENT

Referring now more particularly to FIG. 1 of the drawing, a conventional glass cutter 10 includes a rotatably mounted cutting wheel W disposed on the tip of a cutting head which merges into an elongated handle 12. Mounted on handle 12 is a holder 14 according to the present invention which engages the palm 16 of the hand 18 of a user of operator of cutter 10. It is by provision of holder 14 that the user or operator of cutter 10 is enabled to achieve a steadier grip on cutter 10, with a resulting improvement in the quality of cutting operation.

Holder 14 includes a palm contacting element 20 which actually engages the palm 16 for steadying glass cutter 10, and an attachment element 22 which retains element 20 on handle 12 of cutter 10 in a rigid manner, yet without requiring modification of handle 12 in any way.

The palm contacting element 20 is preferably in the form of a bent member 24 including a curved portion 26 arranged for contacting palm 16 of hand 18, and a connecting portion 28 having a substantially U-shape including a back section 30 and a pair of spaced, substantially parallel, coextending legs 32 and 34 depending from the back section 30.

Attachment element 22 advantageously is a sleeve 36 of generally rectangular cross section. While the cross-sectional configuration of sleeve 36 may vary, it will be appreciated that it generally should be of such configuration as to prevent twisting or turning movement between connecting portion 28 and handle 12.

Leg 34 is preferably tapered, as shown in FIGS. 2 through 6 of the drawing, with the legs 32 and 34 of connecting portion 28 being tapered for forming wedges matingly engaging with sleeve 36.

More specifically, back section 30 of connecting portion 28 preferably has a concavity 38 relative to the adjacent surface 40 of sleeve 36 for facilitating cradling of handle 12 against connecting portion 28. Further, the surface of sleeve 36 opposite the surface 40 is advantageously formed by the illustrated pair of coplanar flanges 42 and 44 extending toward one another in order to provide a certain amount of resilient action which assures a positive gripping action of sleeve 36 on handle 12 and connecting portion 28. In this manner, element 20 is securely fastened in a removable manner not requiring modification of handle 12 to the handle 12 of cutter 10.

In operation, element 22 is placed on handle 12 of cutter 10, the small or tapered end toward cutter wheel W, by sliding the cutter handle 12 through the opening provided at the bottom of element 22. The latter and the holder formed by element 20 are locked into position by placing the small wedge end of element 20 into the large wedge end of element 22, thus sandwiching the handle 12 between element 22 and element 20, as shown in FIGS. 2 and 4. This keeps element 20 in position on handle 12, because of the locking action of one wedge element 22 being forced down into the confining walls of the other wedge elements formed by the legs 32 and 34.

Once assembled, the operator's hand 18 is held over the object, or sheet of glass G, to be cut with the palm 16 down and the glass cutter 10 held between the index finger and the middle or second finger of hand 18, with the ball end 46 of cutter 10 extending upward between the knuckles of hand 18 at the base of the fingers, and the index finger being held straight with the part of the end portion of the index finger pressing firmly on top of the round portion of the back side of handle 12. The latter mentioned round portion is specifically suited for that purpose by being flanged as indicated at 48. The side of the cutter 10 wherein the head of the cutter is provided with, for example, three notches may be disposed up or down toward the sheet of glass G, with the curved or bent element 20 being firmly in the curved part of the palm 16 of hand 18 in order to provide the operator with a firm control of handle 12. When pressure is placed by the whole hand 18 upon this curved element 20, a firm and unshaking result occurs in the control of the cutter blade or wheel W as it contacts and presses upon the glass G. This has the distinct advantage of establishing more firm control on the cutter 10 than if the holder according to the invention is absent.

As will be appreciated from the above description and from the drawings, a holder according to the present invention greatly increases the results obtained by the use of a conventional glass cutter, and the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A holder for a glass cutter, comprising, in combination:
   a. palm contacting means for steadying a glass cutter; and
   b. attachment means for retaining the palm contacting means on a handle of the glass cutter, the palm contacting means being a bent member including a curved portion arranged for contacting the palm of an operator's hand. and a connecting portion having a substantially U-shape including a back section and a pair of spaced, substantially parallel, coextending legs depending from the back section, and the attachment means including a sleeve of rectangular cross section.

2. A structure as defined in claim 1 wherein the sleeve of the attachment means is tapered, the legs of the connecting portion of the arcuate member being tapered for forming wedges matingly engaging the sleeve.

3. A structure as defined in claim 2, wherein the back section of the connecting portion is concave relative to the adjacent surface of the sleeve for facilitating cradling of the handle of the glass cutter against the back section, with the surface of the sleeve opposite the surface adjacent the back section of the connecting portion being formed by a pair of coplanar flanges extending toward one another.

4. A structure as defined in claim 1, wherein the back section of the connecting portion is concave relative to the adjacent surface of sleeve for facilitating cradling of the handle of the glass cutter against the back section, with the surface of the sleeve opposite the surface adjacent the back section of the connecting portion being formed by a pair of coplanar flanges extending toward one another.

5. In combination with a glass cutter including an elongated handle, a holder, comprising, in combination:
   a. palm contacting means for steadying the glass cutter; and
   b. attachment means for retaining the palm contacting means on the handle of the glass cutter, the palm contacting means being a bent member including a curved portion arranged for contacting a palm of an operator's hand, and a connecting portion having a substantially U-shape including a back section and a pair of spaced, substantially parallel, coextending legs depending from the back section, and the attachment means including a sleeve of rectangular cross section.

6. A structure as defined in claim 5, wherein the sleeve of the attachment means is tapered, the legs of the connecting portion of the arcuate member being tapered for forming wedges matingly engaging the sleeve.

7. A structure as defined in claim 6, wherein the back section of the connecting portion is concave relative to the adjacent surface of the sleeve for facilitating cradling of the handle of the glass cutter against the back section, with the surface of the sleeve opposite the surface adjacent the back section of the connecting portion being formed by a pair of coplanar flanges extending toward one another.

8. A structure as defined in claim 5, wherein the back section of the connecting portion is concave relative to the adjacent surface of the sleeve for facilitating cradling of the handle of the glass cutter against the back section, with the surface of the sleeve opposite the surface adjacent the back section of the connecting portion being formed by a pair of coplanar flanges extending toward one another.

* * * * *